June 16, 1925.                                                1,542,677
R. DRAWE
TWO-CYLINDER DOUBLE ACTING FOUR-CYCLE GAS ENGINE
Filed March 9, 1925
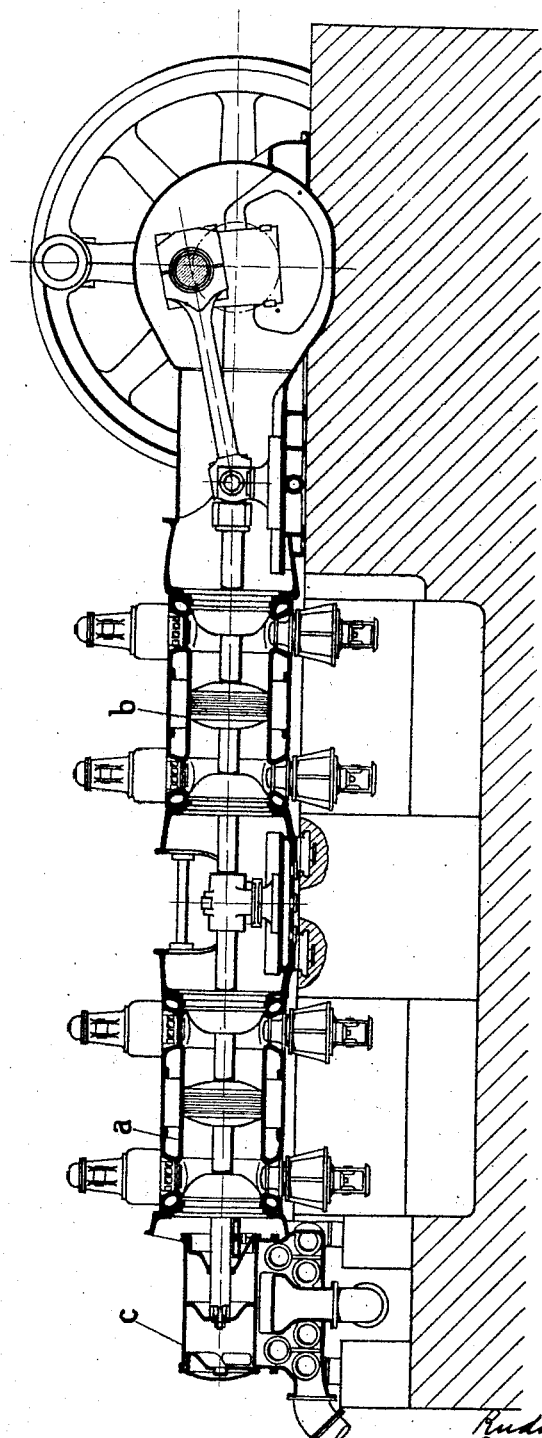
Inventor:
Rudolf Drawe
By Davis & Davis
Atty.

Patented June 16, 1925.

1,542,677

UNITED STATES PATENT OFFICE.

RUDOLF DRAWE, OF CHARLOTTENBURG, GERMANY, ASSIGNOR TO EHRHARDT & SEHMER AKTIENGESELLSCHAFT, OF SAARBRUCKEN, SAARGEBEIT, GERMANY, A CORPORATION OF GERMANY.

TWO-CYLINDER DOUBLE-ACTING FOUR-CYCLE GAS ENGINE.

Application filed March 9, 1925. Serial No. 14,252.

*To all whom it may concern:*

Be it known that I, RUDOLF DRAWE, a citizen of Germany, residing at Charlottenburg, in the State of Prussia, Germany, have invented certain new and useful Improvements in Two-Cylinder Double-Acting Four-Cycle Gas Engines; and I do hereby declare the following to be a full, clear, and exact description of the invention, such as will be enable others skilled in the art to which it appertains to make and use the same.

This invention relates to two-cylinder engines of the double acting type, i. e. the type in which driving gas is applied alternately to both sides of the piston. It relates more particularly to engines of this kind arranged for scavenging and charging of the cylinder in such a manner that the entire air (i. e., the air for combustion as well as for scavenging) is subjected to pressure and conducted through the cylinder but, during a part of the suction stroke, is throttled to enable the gas to be drawn in. It is known that machines of this kind have the advantage that a separate air channel or pipe for scavenging purposes is eliminated and that only very slight constructional changes of ordinary engines of the four-cycle type are required in building them.

Large gas engines are often equipped with rotary blowers for producing the necessary compressed air. If piston pumps, which offer certain advantages on account of their efficiency and because they can be easily combined with a gas engine, are employed, a complication arises which is due to the fact that these air pumps have to be regulated.

The air pump compresses the entire air required for combustion and scavenging in the engine to a pressure of 0.2 atmospheres above atmospheric pressure. With regard to the entrance of air into the operating cylinder of the gas engine a distinction must be made between three periods, viz the scavenging, suction and charging periods.

The amount of air that enters the cylinder in the scavenging period is dependent on the counter-pressure existing at this time in the operating cylinder and this counter-pressure is in turn dependent on the resistance that the exhausted burnt gases have to overcome in the exhaust pipes. Experience has shown that this amounts at full load to about 0.1 atmospheres above atmospheric pressure. In consequence of the slight difference of pressure between the air pipe and working cylinder, amounting to a maximum of 0.1 atmospheres, the scavenging effect is small and the air consumption at this time is also small. During the suction stroke the amount of air that passes into the cylinder is also small by reason of the fact that peculiarities of the operation of the engine demand a considerable throttling of the air admission channels to enable an excess of gas, which has a much lower pressure than the air, to be drawn in.

Most of the air for combustion enters the cylinder during the charging period. At the beginning of this period, at the end of the suction stroke, the pressure in the cylinder amounts to 0.9 atmospheres. The difference between this pressure and the pressure in the air pipe amounts to 1.2—0.9=0.3 atmospheres. This comparatively large difference of pressure naturally results in the entrance of a considerable amount of air.

When the load is small, or the engine is running without load, a considerable charge in the cylinder is undesirable because it results in an appreciable impoverishment of the gas mixture by a great excess of air.

In accordance with this invention the amount of air pressed into the engine is not interfered with, but an improvement is obtained by enabling the excessive amount of air that passes into the cylinder to be conducted off through prolonging the scavenging period so that it is maintained during most of the exhaust stroke.

By maintaining the scavenging throughout almost an entire stroke a continuous scavenging operation is caused to take place in a tandem four-cycle engine in which driving gas is applied to four cylinder ends because at each stroke one of the four cylinder ends is scavenged. By this means the air pipe is continually kept connected with the exhaust pipe, and the pressure in the air pipe is determined to a greater extent than hitherto by the counter-pressure of the exhaust pipe. Since, however, at a reduced output the counter-pressure in the exhaust pipe sinks as a result of the smaller amount of the burnt gases that have to be exhausted, the pressure in the air pipe sinks automatically at small loads because the air is now enabled to flow off more freely during the scavenging period. The reduced air pressure then results in a reduction of the charge and therefore in the diminution of the useful air charge.

A scavenging arrangement in accordance with this principle for gas engines is known, but in the known arrangement a rotary fan or blower is used for scavenging purposes. The operation of the blowers is such that they require no regulation but they have a very low efficiency and cannot be satisfactory combined with the gas engine.

If a blower combined with such an engine is replaced by a piston pump for scavenging purposes it would be necessary to provide the scavenging pump with a special regulating device so that the amount of air delivered at small loads adapts itself to the reduced amount of air required for combustion. This regulating device can be dispensed with by an arrangement which enables the air that is not required for the charge at small loads to pass through the working cylinder and flow off into the exhaust pipe in the manner described below. To this end the operation of the usual inlet valves of the engine is arranged so that the entrance of the scavenging air commences very early, and in fact at the beginning of the exhaust stroke and continues uninterruptedly throughout said stroke. According as the counter pressure in the exhaust pipe is greater or smaller, more or less air then passes through the cylinder during the scavenging period. When the machine carries a considerable load the amount of air passing through the cylinder into the exhaust pipe is small and at small loads when the counter pressure is small, a greater amount of air passes into the exhaust pipes. As the piston air pump always delivers equal amounts of air the amount of air available for the charging at small loads is smaller.

The invention is illustrated by way of example in the drawing in which a two-cylinder four-cycle tandem gas engine of known construction is shown.

In the drawing $a$ and $b$ are the two cylinders of the gas engine and $c$ is the scavenging pump.

It will appear from the drawing that the pump can be conveniently combined with the engine when the pump piston is arranged on the same piston rod as the pistons of the gas engine.

Having now particularly described and ascertained the nature of our said invention and in what manner the same is to be performed, we declare that what we claim is:

1. A two-cylinder four-cycle gas engine in which the fuel gas is alternately applied to both sides of the piston and which is arranged for scavenging and charging in such way that the entire air is subjected to pressure and continuously conducted through the cylinder, except that during a part of the suction-stroke the air is throttled so as to enable the gas to be drawn in, characterized by the combination with such type of engine of a reciprocating-piston scavenging pump actuated by the reciprocating piston-rod of the engine, means being provided whereby the scavenging period is prolonged to such an extent that it commences at the beginning of the exhaust stroke and is maintained up to the end of this stroke.

2. The method herein described of operating a two-cylinder four-cycle gas-engine in which the driving gas is alternately applied to both sides of the piston and in which air under pressure is used for charging and scavenging, consisting in employing the reciprocating pump for maintaining the air pressure and in commencing the scavenging period at the beginning of the exhaust stroke in each combustion chamber and maintaining it to the end of this stroke.

3. The method of operating a two-cylinder four-cycle gas engine in which combustible mixture is alternately delivered to both sides of each piston and in which air under pressure is delivered to each cylinder during the charging period thereof and is concurrently delivered by a synchronously-operated reciprocating pump to one or another cylinder throughout the greater portion of the exhaust period thereof for the purpose of proportioning the charge of air delivered to the charging cylinder in accordance with the load on the engine.

4. The method of operating a two-cylinder, four-cycle gas engine in which combustible mixture is alternately delivered to both sides of each piston and in which air under pressure is delivered to each cylinder during the charging period thereof and in which a fixed quantity of air under pressure is concurrently delivered by a pump whose reciprocating piston is attached to the piston-rod of the engine to a charging cylinder and to an exhausting cylinder of the engine for the purpose of controlling the amount and the pressure of air delivered to the charging cylinder of the engine by the varying load on the engine.

5. The method of operating a two-cylinder, four-cycle gas engine in which combustible mixture is alternately delivered to both sides of each piston and in which air under pressure is delivered to each cylinder during the charging period thereof and in which air under pressure is concurrently delivered from a synchronously-operated reciprocating pump to a charging and an exhausting cylinder of said engine.

In testimony whereof I affix my signature in presence of two witnesses.

RUDOLF DRAWE.

Witnesses:
 WLAD ENDEY,
 ROY V. FEX.